United States Patent
Böcker et al.

(10) Patent No.: US 12,517,002 B2
(45) Date of Patent: Jan. 6, 2026

(54) MONITORING ATTACHMENT FOR MONITORING A NUT OF A SCREW CONNECTION

(71) Applicant: Weidmüller Interface GmbH & Co. KG, Detmold (DE)

(72) Inventors: Marc Böcker, Steinheim (DE); Steffen Niggemann, Paderborn (DE); Ralf Schumacher, Lemgo (DE); Gerald Busch, Lage (DE); Christian Heggemann, Detmold (DE)

(73) Assignee: WEIDMÜLLER INTERFACE GMBH & CO. KG, Detmold (DE)

( * ) Notice: Subject to any disclaimer, the term of this patent is extended or adjusted under 35 U.S.C. 154(b) by 472 days.

(21) Appl. No.: 18/245,436

(22) PCT Filed: Sep. 24, 2021

(86) PCT No.: PCT/EP2021/076345
§ 371 (c)(1),
(2) Date: Sep. 12, 2023

(87) PCT Pub. No.: WO2022/063978
PCT Pub. Date: Mar. 31, 2022

(65) Prior Publication Data
US 2024/0310238 A1 Sep. 19, 2024

(30) Foreign Application Priority Data
Sep. 24, 2020 (DE) .................... 20 2020 105 477.5

(51) Int. Cl.
*G01M 5/00* (2006.01)
*F16B 39/10* (2006.01)
*G01L 5/24* (2006.01)

(52) U.S. Cl.
CPC ........... *G01M 5/0033* (2013.01); *F16B 39/10* (2013.01); *G01L 5/243* (2013.01); *G01M 5/0083* (2013.01); *F05B 2260/301* (2013.01); *F16B 2200/93* (2023.08)

(58) Field of Classification Search
CPC ... G01M 5/0033; G01M 5/0083; G01L 5/243; F16B 39/10; F16B 2200/93
See application file for complete search history.

(56) References Cited

FOREIGN PATENT DOCUMENTS

| DE | 102013218845 A1 | * | 3/2015 | .......... G01M 5/0083 |
| JP | 2015059819 A | * | 3/2015 | .............. G01L 5/00 |
| WO | WO-2017203220 A1 | * | 11/2017 | ............. G01L 5/243 |

* cited by examiner

*Primary Examiner* — Benjamin R Schmitt
(74) *Attorney, Agent, or Firm* — Laubscher & Fretwell, P.C.

(57) ABSTRACT

The invention relates to a monitoring attachment for monitoring a nut (9) of a screw connection for cracking, deformation and/or breakage, wherein the monitoring attachment has a conductor loop which is guided around an outer periphery of the nut (9) and which is interrupted in the event of deformation, cracking and/or breakage of the nut (9). The monitoring attachment is characterised by at least two segments (1, 1', 1", 1''') which together enclose the periphery of the nut (9) and are held together frictionally at at least one radial connection point, wherein the conductor loop is guided over contacts at the connection point.

18 Claims, 13 Drawing Sheets

MONITORING ATTACHMENT FOR MONITORING A NUT OF A SCREW CONNECTION

This application is a § 371 national stage entry of International Patent Application No. PCT/EP 20211076345 filed Sep. 24, 2021. Application No. PCT/EP 2021/076345 claims priority of DE 20 2020105477.5 filed Sep. 24, 2020. The entire content of these applications is incorporated herein by reference.

BACKGROUND OF THE INVENTION

The invention relates to a monitoring attachment for monitoring a nut of a screw connection for cracking, deformation and/or breakage, wherein the monitoring attachment has a conductor loop which is guided around an outer periphery of the nut and which is interrupted in the event of deformation, cracking and/or breakage of the nut.

Nuts of highly stressed screw connections, e.g. in wind energy plants, are monitored for safety reasons in order to detect damage as promptly as possible Such highly stressed screw connections in wind power plants are, as a general rule, part of flange connections in which a plurality of screw connections are arranged on the periphery of the flange. If a breakage of one or more nuts is detected, the nut can be replaced before a breakage threatens the entire flange connection. In this manner, it is possible to avoid consequential damage which endangers persons, or economic consequential damage.

BRIEF DESCRIPTION OF THE PRIOR ART

Document EP 3 047 144 B1 describes such a monitoring attachment which has a monitoring body which is formed as a nut cap and which surrounds the nut radially at its periphery. In the event of damage, e.g. in the event of the nut splitting open, the monitoring body is also destroyed. The monitoring body has a circumferential electrical conductor in the form of an electrically conductive coating. Destruction of the monitoring body leads to an interruption of the electrical line, which is detected.

This design has proven its worth in functional terms but cannot be reused after the monitoring body has been broken. A further disadvantage is that the electrical conductor, which is only protected by paint, is vulnerable to corrosion which can be problematic in the case of offshore wind power plants, for example, which are surrounded by salty air.

Document WO 2018/007143 A1 also describes a monitoring attachment which is formed in the form of a sheath and in which a conductor is embedded in a material, for example an electrically non-conductive polymer material, as a result of which greater resistance to corroding environmental conditions is achieved. Here too, the monitoring attachment is destroyed in the event of a nut being broken, which leads to an interruption of the conduction. This design likewise does not allow reuse.

The present invention was developed to create a monitoring attachment of the aforementioned type, which safely detects deformation, cracking and/or breakage of a nut, is as resistant as possible to corroding environmental conditions and which can be reused after being triggered.

SUMMARY OF THE INVENTION

A monitoring attachment, according to the invention, of the aforementioned type has at least two segments which together enclose the periphery of the nut and are held together frictionally at at least one connection point, wherein the conductor loop is guided over contacts at the connection point.

According to the invention, at least one connection point between the segments is thus equipped with a functionally closed connection which is opened in the event of a breakage, a crack and/or other damage or deformation of the nut, as a result of which an electrical contact, which is established inside the connection, is interrupted. In this case, the connection is opened in a non-destructive manner against a closing force, so that the monitoring attachment can be reused again after the damaged nut is exchanged.

Since the conductor loop is interrupted through the opening of the contact, and not through tearing of the conductor, it can be equipped with a sufficiently thick isolation which also protects against corrosion. For example, the conductor loop can be embedded in a casting resin. The contacts can also be outwardly sealed at the connection point against environmental influences, so that overall high resistance to corroding environmental influences can be implemented.

The contacts are preferably electrical contacts and the conductor loop is preferably a loop of an electrical conductor. Within the framework of the application, a conductor loop should, however also be understood as a loop of a light conductor and a light-conducting transition from one segment to a next segment serves as a contact. Widening of the connection point leads, in the event of a subsequent optical detection, to a smaller optical transmission through this connection point, which can be detected analogously to an increasing electrical resistance.

In an advantageous configuration of the monitoring attachment, two semicircular segments, which join to form a ring enclosing the nut, are present and accordingly two connection points are provided. In principle, it is also possible for more than two segments to be used. However, it has been shown that a high degree of triggering sensitivity, in the event of the nut being damaged, is achieved with just two segments.

There is preferably provided a plug-in connection at at least one connection point, in which plug-in connection one of the segments has a plug section and another of the segments has a receiving section into which the plug section can be plugged into. Such a plug-in connection is mechanically robust, enables good isolation of the contacts from environmental influences and nevertheless can be easily separated in the axial direction (relative to the circular ring formed by the segments). For example, the plug section can have a cylindrical shaft which is plugged into a shaft receptacle of the receiving section. A sealing ring can be inserted into a groove of the shaft for sealing.

If two segments are employed, either both connection points can be such plug-in connections or only one of the connection points can be a plug-in connection, while the other connection point is formed by a hinge.

In the plug-in connection, an electrical contact element is preferably arranged in one segment and an electrical mating contact element is arranged in the other segment, as contacts of the at least one connection point. An advantageous configuration of the contact arises when the electrical contact element has a deflecting contact tip with which it contacts a contact surface of the mating contact element.

This configuration of contact element and mating contact element produces on the one hand good contact between both elements, which, on the other hand is interrupted in a defined manner when the connection point is opened. An opening point can be influenced by the dimensions of the spring path of the deflecting contact tip. It is thus possible that the electrical connection between the contact element and the mating contact element is interrupted when the connection point is opened by one millimeter or by a few millimeters. Alternatively, it is also possible to employ a contact system with a pin contact and a socket contact.

In order to keep the at least one connection point frictionally closed, a snap-lock connection or a connection via magnetic force can preferably be provided at the connection point between the adjacent segments. The magnetic force can be obtained by two magnets which interact with one another or by a magnet and a ferromagnetic element. The magnets, or the magnet and the ferromagnetic element, lie directly on top of one another, and electrically contact one another when the connection point is in the closed state. In this case, they can act as contacts of the conductor loop via which the opening of the connection point is detected.

In a further advantageous configuration of the monitoring attachment, there is arranged in one of the segments a circuit board from which conductor sections lead to the contacts of the at least one connection point, wherein the conductor sections and the contacts form the conductor loop. The conductor sections can in this case be cables or conductor tracks on the specified circuit board or a further circuit board. On the circuit board, there is preferably arranged a power cable and/or a power plug which is connected to the conductor loop, in order to be able to ascertain the state of the conductor loop and thus of the monitored nut using an external evaluation unit. Such a wired evaluation offers the advantage of wiring, in a simple manner, a number of the shown monitoring attachments in series and to connect the series connection to only one evaluation unit. Through the type of wiring, an interruption of contact in any of the monitoring attachments involved is detected using only one monitoring apparatus. Alternatively, it is also possible to arrange on the circuit board a radio transmitter which wirelessly transmits a signal to an external receiving station via a closed or opened conductor loop.

In a further embodiment of the monitoring attachment, there is arranged on the circuit board a light-emitting diode (LED), connected in parallel relative to the conductor loop. If an interruption of the conductor loop occurs in the monitoring attachment, a measuring current commutates to the LED which lights up and thus signals the interruption of the associated conductor loop. Thus, particularly with several monitoring attachments connected in series, it is clear at first glance which monitoring attachment has been triggered.

In one configuration in which the segments have a housing open to one side, this can preferably be filled with a casting compound, in particular casting resin, wherein the circuit board and the conductor sections can be embedded in the casting resin in order to be protected from environmental influences as well as possible. A translucent casting compound is preferably used for this purpose, as a result of which light emitted by the LED is visible from the outside without special light-conducting elements having to be available. It is only necessary to provide a small opening above the LED in the housing of the segment.

In a further advantageous configuration, the monitoring attachment has a connecting cable for connection to a further monitoring attachment. It is thus possible to form a chain of monitoring attachments connected to one another in series in order to be able to monitor a number of nuts using one monitoring device which is connected to the start of the chain with a power cable.

BRIEF DESCRIPTION OF THE FIGURES

The invention will be explained in greater detail below using exemplary embodiments as shown in the accompanying drawing in which.

DETAILED DESCRIPTION

Figure 9A:
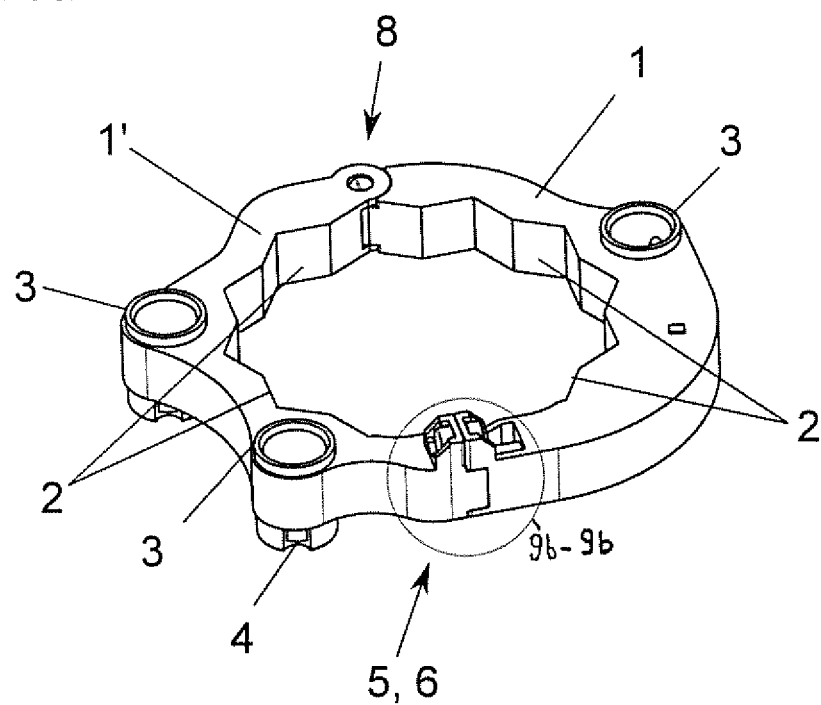
FIG. 9a is a perspective view of the monitoring attachment of the second embodiment without a nut.
Figure 9B:
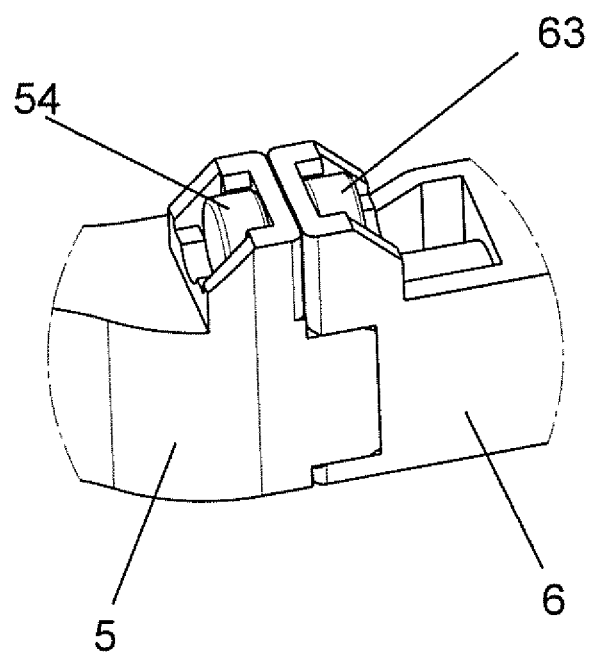
FIG. 9b is a detailed view of a connecting region of the monitoring attachment of FIG. 9a taken along line 9b-9b.
Figure 9C:
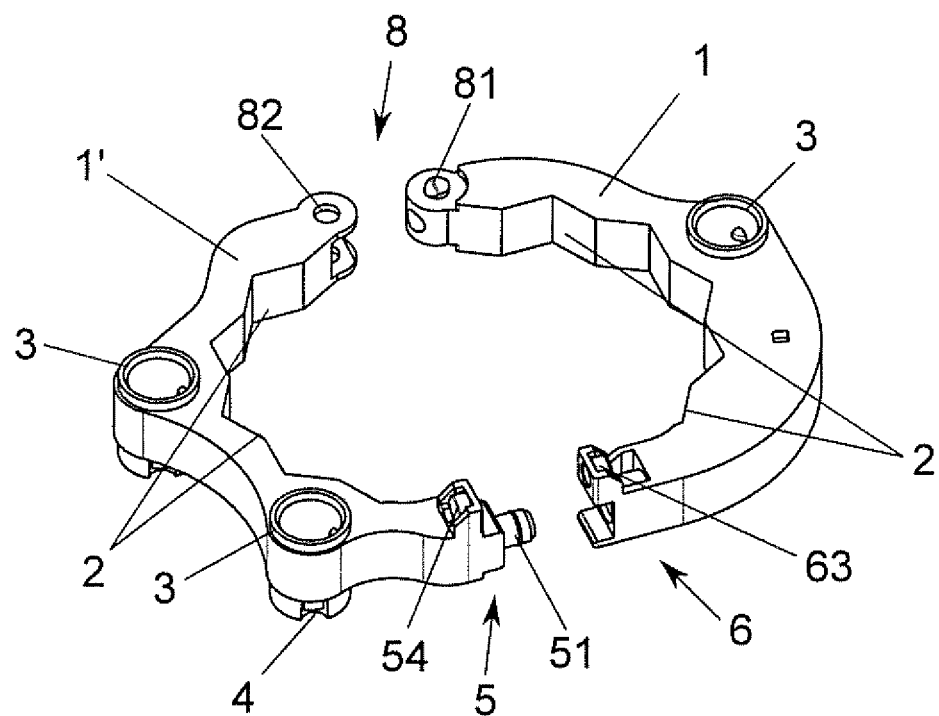
FIG. 9c is a perspective view of the monitoring attachment of the second embodiment of the monitoring attachment of FIG. 9a without a nut in an opened state.
Figure 10:
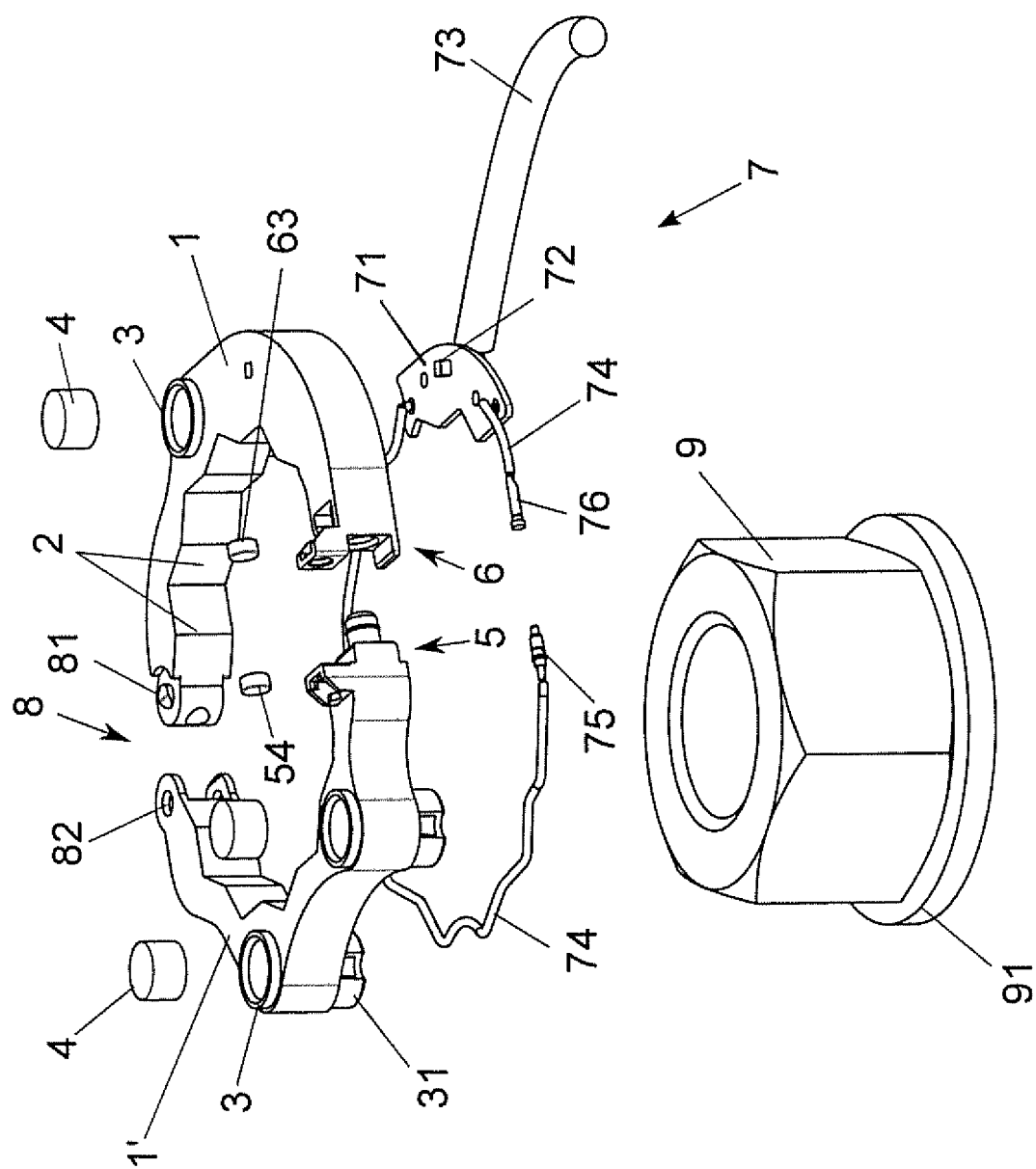
FIG. 10 is an exploded perspective view of the monitoring attachment of the second embodiment with a nut.
Figure 11A:
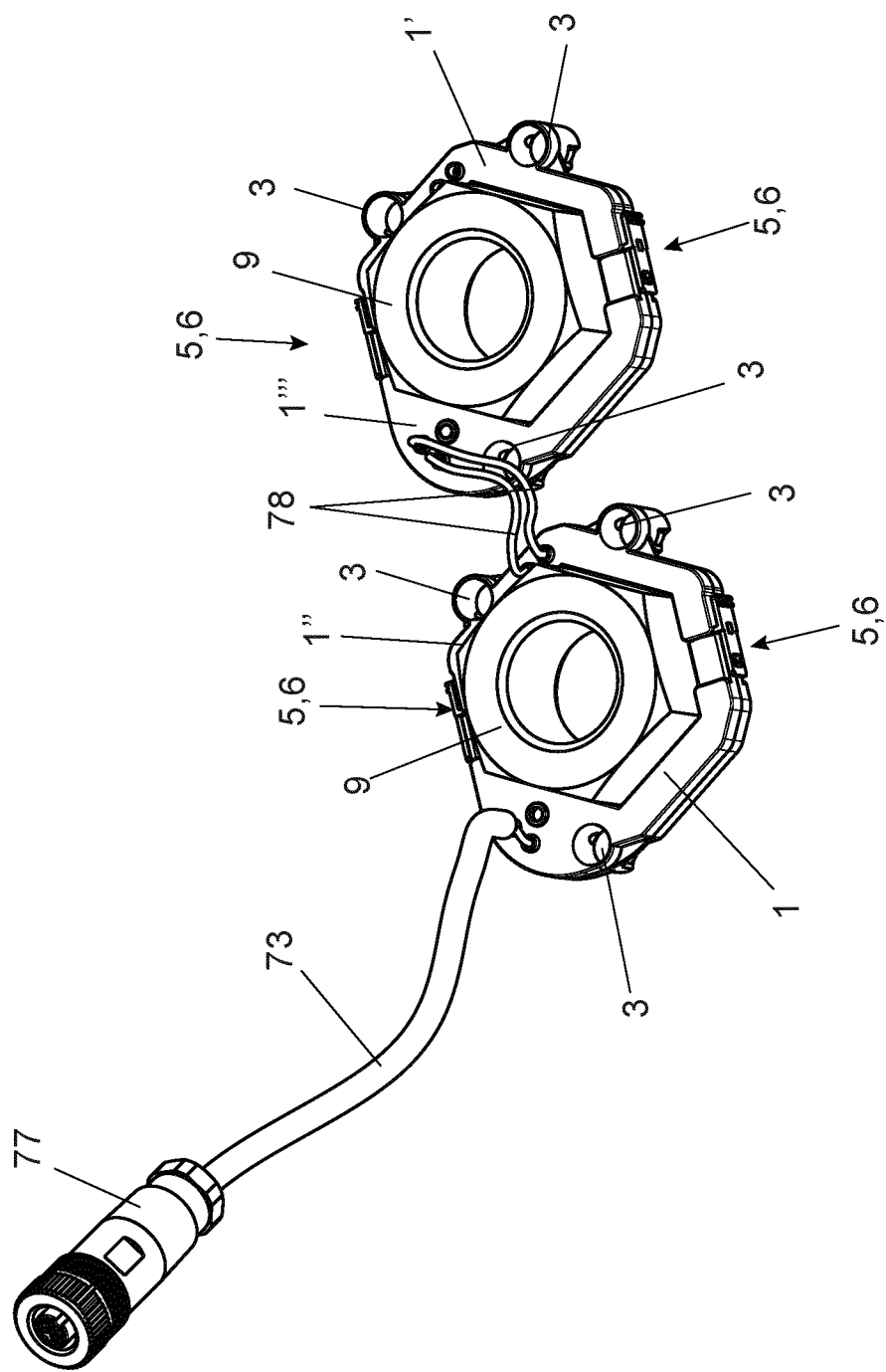
FIGS. 11a and 11b are perspective views, respectively, of two coupled monitoring attachments in a third embodiment, in each case placed onto a nut.

The figures described below depict three exemplary embodiments of monitoring attachments according to the application. FIGS. 1a-6 show a first embodiment. FIGS. 7-10 show a second embodiment and FIGS. 11a-12 show a third embodiment in different depictions, respectively.

Identical reference numbers in all figures denote identical or identically acting elements. In addition, for the sake of clarity, not every reference number is depicted in each figure. Likewise, for the sake of clarity, a power cable (reference number 73) and a power plug (reference number 77) is not depicted in all figures. It will be understood that, in each case, this can be present in the form shown in some figures or in a modified form.

FIGS. 1a, 1b and 2a, 2b depict a first embodiment of a monitoring attachment for a nut 9, together with this nut, in perspective or in a plan view. The figures bearing the index "a" show the monitoring attachment in each case in a closed and operative state. The figures bearing the Index "b" show the monitoring attachment in an opened state, for example when installed on or removed from the nut 9. The nut 9 is, for example, a nut of a screw connection of a flange mounting in a wind power plant. Such nuts can, for example, have a size of M30 or M36 Instead of the nut 9, it is of course also possible to monitor a screw or bolt head of a screw connection with the monitoring attachment according to the invention. In this sense, nuts and screw or bolt heads should be regarded as being synonymous within the framework of the application.

The monitoring attachment has two semicircular segments 1, 1' which radially surround the nut 9 at their periphery. The segments 1, 1' are preferably plastic elements which are made in one piece, e.g. in one plastic injection-molding method.

Due to the shape as half-rings, the two segments 1, 1', in the closed state, join to form a ring which radially envelops the nut 9. On the inner side facing the nut 9, the segments 1, 1' are equipped with internal teeth 2 which, in the assembled or connected state, form a regular dodecagon. Alternatively, instead of a dodecagon, a regular hexagon can also be formed which reflects the outer contour of the nut 9. The configuration as a dodecagon makes it possible to place the monitoring attachment onto the nut 9, rotated in 30° steps. In the configuration with a hexagonal inner contour, mounting in 60° steps is possible. In both cases, the connected segments 1, 1' tightly enclose the nut 9, i.e. with a low amount of play and preferably at least at points in a form-fitting manner, so that a change in the shape of the nut 9 through deformation, breakage or cracking leads to force being exerted on the segments 1, 1'.

In the depicted embodiment, receptacles 3 for magnets 4 are formed in the segments 1, 1'. Via the magnets 4, the monitoring attachment can be mounted, in a region beside the nut 9, onto the flange for example, through which the screw connection leads. In the present case, the monitoring attachment is formed to be placed onto a nut 9 with a washer 91. The magnet receptacles 3 are positioned for this purpose so that the magnets 4 beside the washer 91 rest on the component, e.g. the flange. For this purpose, the magnet receptacles 3 in each case have a dome 31, which protrudes downwards beyond the other limiting edge of the segment 1, 1'. In the example shown, two magnets 4 are arranged in the segment 1, 1' and one magnet 4 is arranged in segment 1. The number and division of the magnets 4 may vary from this in alternative configurations.

According to the invention, there is provided, at least in a connection point between the segments 1, 1', a frictionally closed connection which is opened in the event of a breakage, a crack and/or other damage or deformation of the nut 9, as a result of which an electrical contact, which is established inside the connection, is interrupted. In this case, the connection is opened in a non-destructive manner against a closing force, so that the monitoring attachment can be placed onto the new nut 9 after the damaged nut 9 is exchanged, wherein the connection is closed again, the electrical connection is produced again, and the monitoring attachment is ready for use again.

In the present embodiment, the segments 1, 1' are electrically and mechanically connected to one another at both connection points at the radial ends of the segments 1, 1', in each case via a plug-in connection. The plug-in connection is formed through the interplay of a plug section 5 and a receiving section 6. In the embodiment shown, the segments 1, 1' are configured to be mirror images with regard to the plug-in connections, in that each segment 1, 1' has a plug section 5 at one radial end and a receiving section 6 at the other radial end.

Figure 1A:
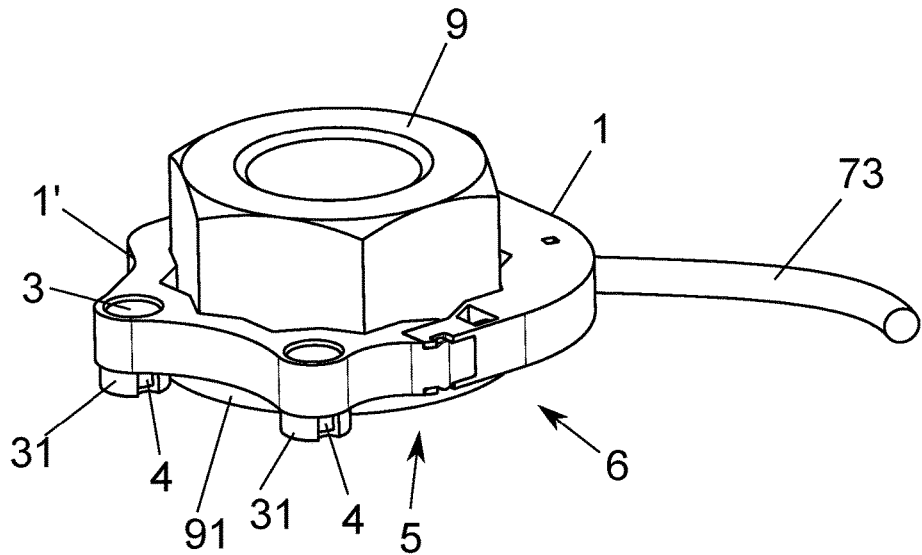
FIG. 1a is a perspective view of a monitoring attachment in a first embodiment placed onto a nut in a closed state.
Figure 1B:
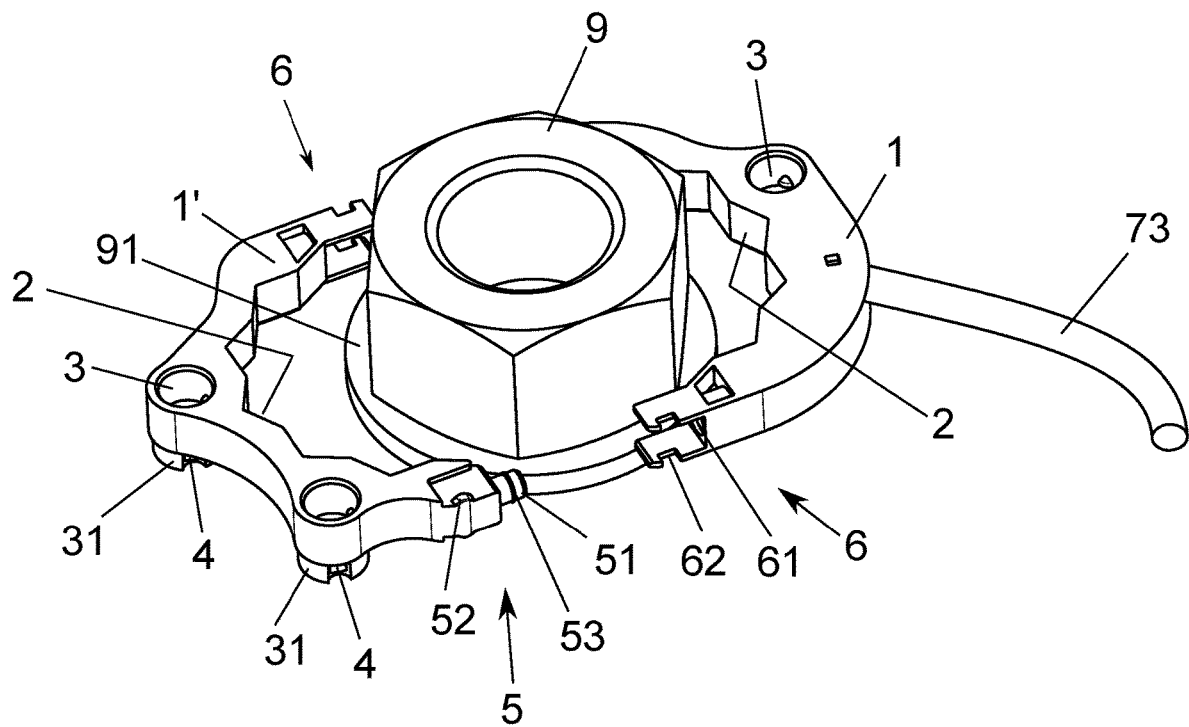
FIG. 1b is a perspective view of the monitoring attachment according to FIG. 1a in an opened state.
Figure 2A:
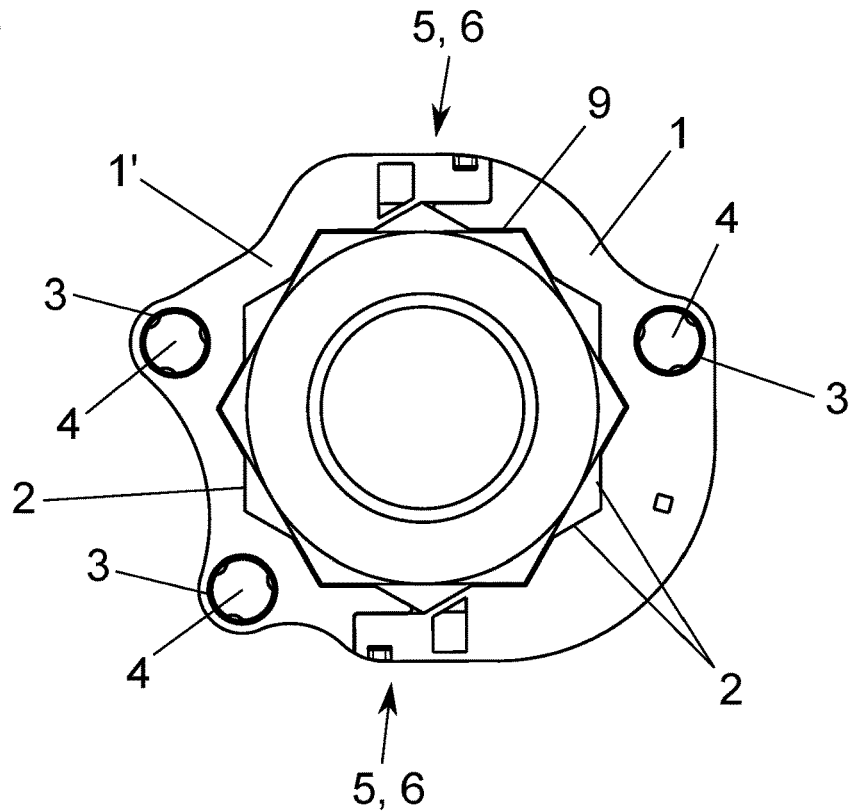
FIGS. 2a and 2b are top plan views of the monitoring attachment of FIGS. 1a and 1b in a closed and an opened state, respectively.
Figure 2B:
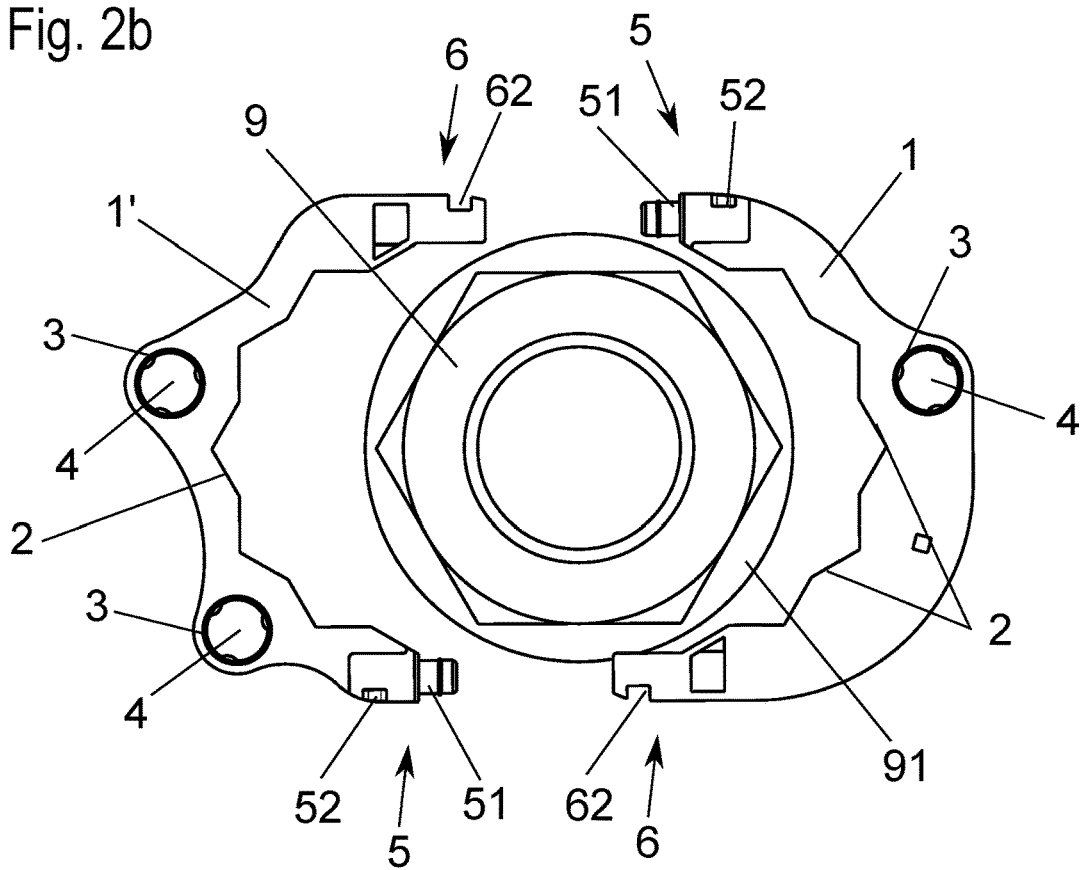
Figure 3A:
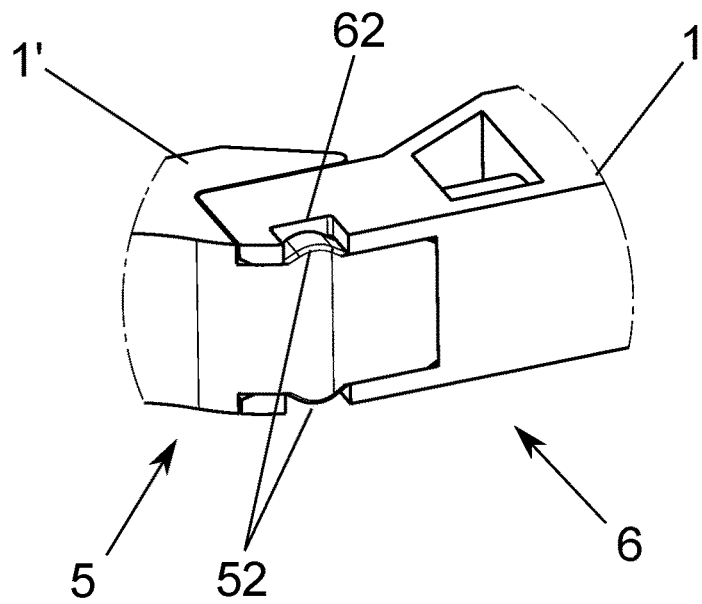
FIGS. 3a and 3b are detailed perspective views of the monitoring attachment of the first embodiment in a closed and an opened state, respectively.
Figure 3B:
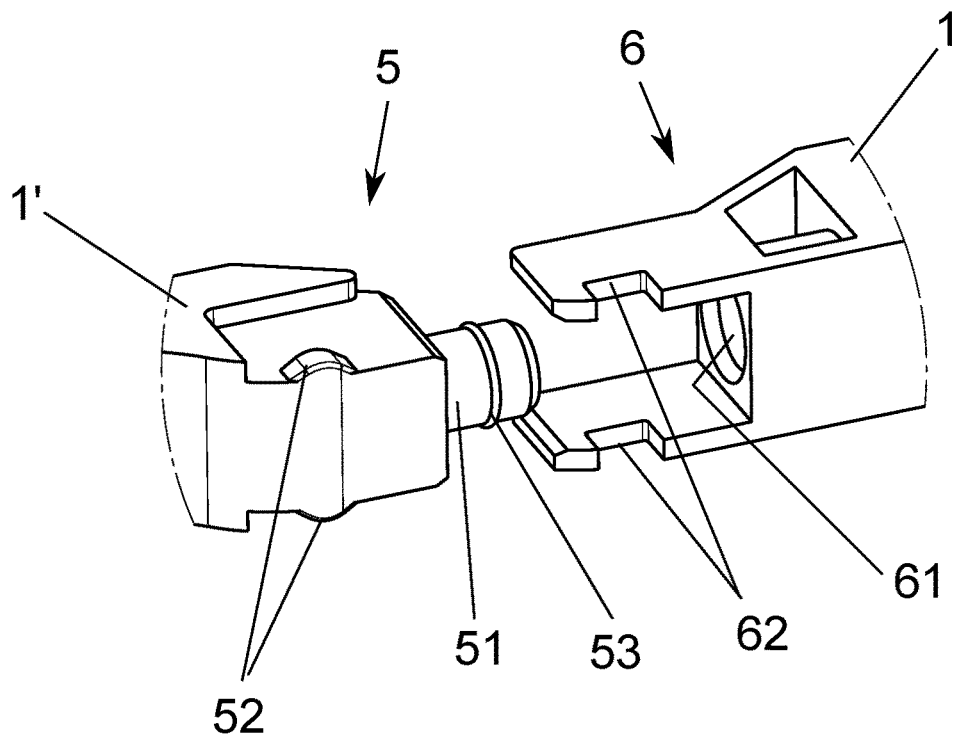

The plug-in connection between the segments 1, 1' can be seen in greater detail in the enlargement in FIGS. 3*a* and 3*b*.

The plug section 5 includes a protruding shaft 51 and a snap-lock element 52. In the present embodiment, the shaft 51 is equipped with a circumferential sealing ring 53 in order to prevent ingress of moisture into the plug-in connection.

The receiving section 6 has a corresponding shaft receptacle 61 into which the shaft 51 can be plugged. In addition, mating snap-lock elements 62 are provided which, in the plugged-in state, lock onto the snap-lock elements 52 and mechanically fix the plug-in connection in the closed state. The fixing is designed such that the plug-in connection is held securely in the closed state and such that, when the monitored device is operating normally, forces acting on the segments 1, 1 for example acceleration forces, do not open the plug-in connection. In the event of breakage of or other damage to the nut 9, the plug section 5 and the receiving section 6 are moved away from one another at least partly against the snap-lock forces, i.e. the plug-in connection is opened, which takes place in a non-destructive manner.

Figure 4:
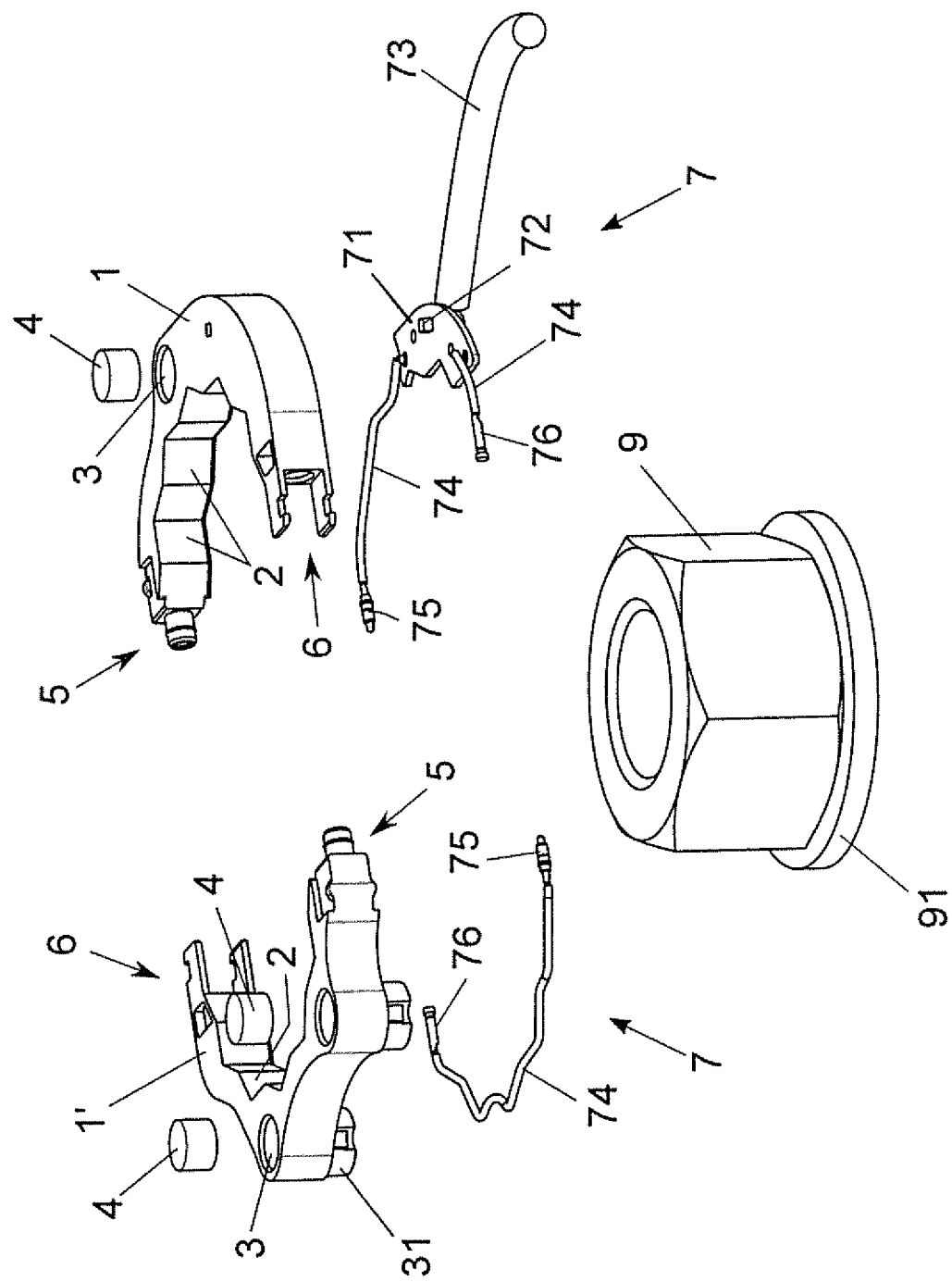
FIG. 4 is an exploded perspective view of the monitoring attachment of the first embodiment with a nut.

In FIG. 4, the monitoring attachment is depicted in an exploded drawing with a nut 9 and a washer 91 from the first embodiment.

In this figure, the magnets 4, which are inserted into magnet receptacles 3, can be clearly seen. Furthermore, a conductor-and-contact arrangement 7 can be seen, which includes a conductor loop which runs through both segments 1, 1' and which is interrupted when one of the plug-in connections is opened.

The conductor-and-contact arrangement 7 has a circuit board 71 which is inserted into the segment 1. A signal light-emitting diode (LED) 72, the function of which will be explained below, is arranged on the circuit board 71. Furthermore, a power cable 73, which passes both ends of the conductor loop from the monitoring attachment to an external evaluation assembly, is mounted on the circuit board 71. In the example shown, the power cable 73 is directly mounted to, in particular soldered onto, the circuit board 71. In alternative configurations, a plug connector can instead be mounted on the circuit board 71, into which the power cable 73 is then plugged.

Furthermore, two conductor sections 74, which end in a contact element 75 and a mating contact element 76, extend from the circuit board 71. The conductor sections 74 run inside segment 1 up to the plug section 5 and the receiving section 6. The contact element 75 is inserted into the plug section 5 as a contact and the mating contact element 76 is inserted into the receiving section 6. In the depicted example, the conductor sections 74 are formed by cables, e.g. stranded conductors. Alternatively, all or some of the conductor sections 74 can also be guided to the connection point as conductor tracks of the circuit board 71 or of a further circuit board or in the form of a busbar and/or a lead frame or another conductor.

Figure 5A:
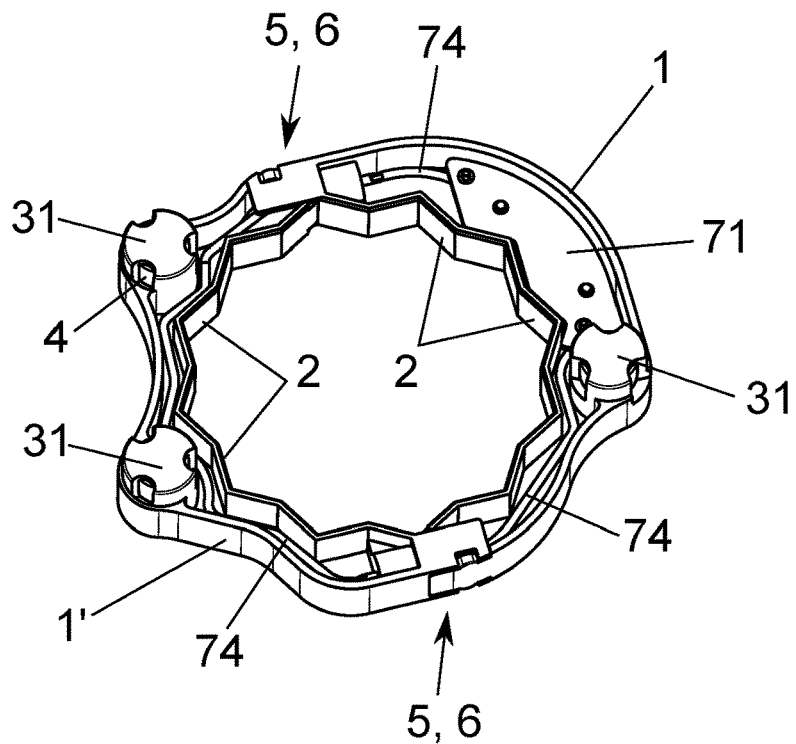
FIGS. 5a and 5b are bottom perspective views of the monitoring attachment in the closed and opened states, respectively, without nuts.
Figure 5B:
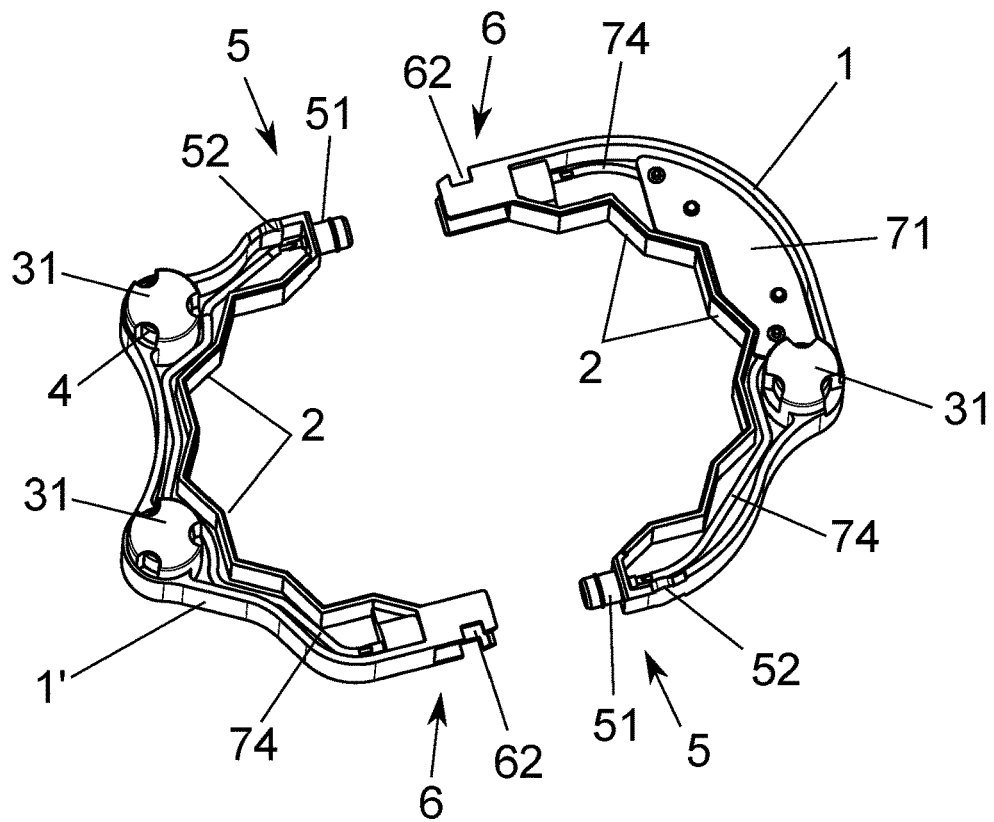

The positioning of the circuit board 71 in the segment 1 can be seen in FIGS. 5*a* and 5*b*. The two figures show the monitoring attachment in the closed and opened state of the plug-in connections in a perspective view, looking onto the underside. i.e. the side which rests on the flange, for example. The segments 1, 1' are configured to be downwardly open, which simplifies production in one piece in an injection-molding process. After the components have been inlaid, the remaining cavity can be filled with an electrically insulating casting resin, as a result of which the components of the conductor-and-contact arrangement 7 can, on the one hand, be mechanically fixed, and can, on the other hand be protected from the ingress of moisture or other corrosive media.

Figure 6:
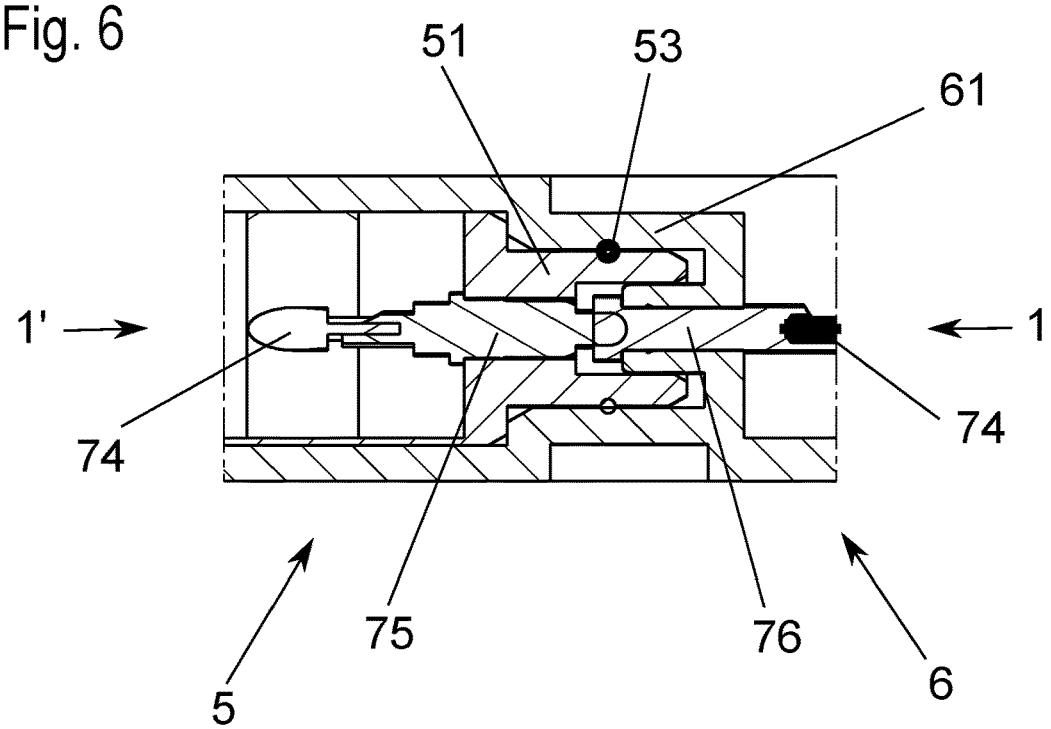
FIG. 6 is a sectional view through a connecting region of the monitoring attachment of the first embodiment.

FIG. 6 shows, in a sectional view, details of the contact region when the plug section 5 and receiving section 6 are plugged together.

The contact element 75 and the mating contact element 76 are inserted centrally into corresponding receptacles in the plug section 5 and receiving section 6. In the depicted embodiment, the contact element 75 is equipped with an axially deflecting contact tip which has a spring path in the order of one to a number of millimeters. The mating contact element 76 substantially has an axially flat contact plate at its end against which the spring tip of the contact element 75 presses for contacting. This configuration of a contact element 75 and mating contact element 76 produces on the one hand good contact between both elements, which, on the other hand is interrupted when the connection point is opened by a few millimeters. In this way, a pushing-apart or pivoting-apart of the segments 1, 1' from one another when the monitored nut is damaged can be reliably detected.

The contact element 75 and the mating contact element 76 are preferably crimped or soldered to the conductor sections 74.

In addition, sealing between the shaft 51 of the plug section 5 and the shaft receptacle 61 of the receiving section 6 by the sealing ring 53 can be clearly seen in FIG. 6.

FIGS. 7-10, b depict a second embodiment of a monitoring attachment for a nut 9. As already mentioned, identical reference numbers denote elements which are identical or act identically to in the first embodiment.

Figure 7:
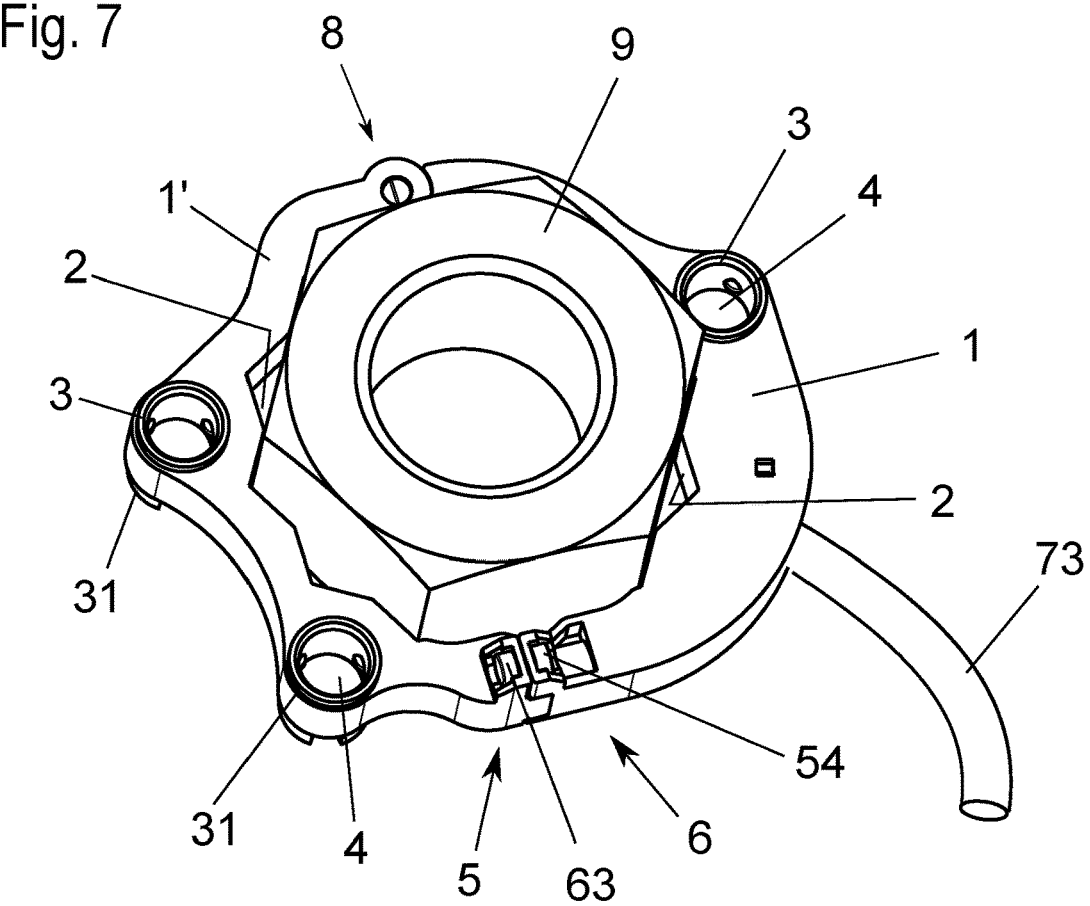
FIG. 7 is a perspective view of a monitoring attachment placed onto a nut according to a second embodiment of the invention in a closed state.
Figure 8A:
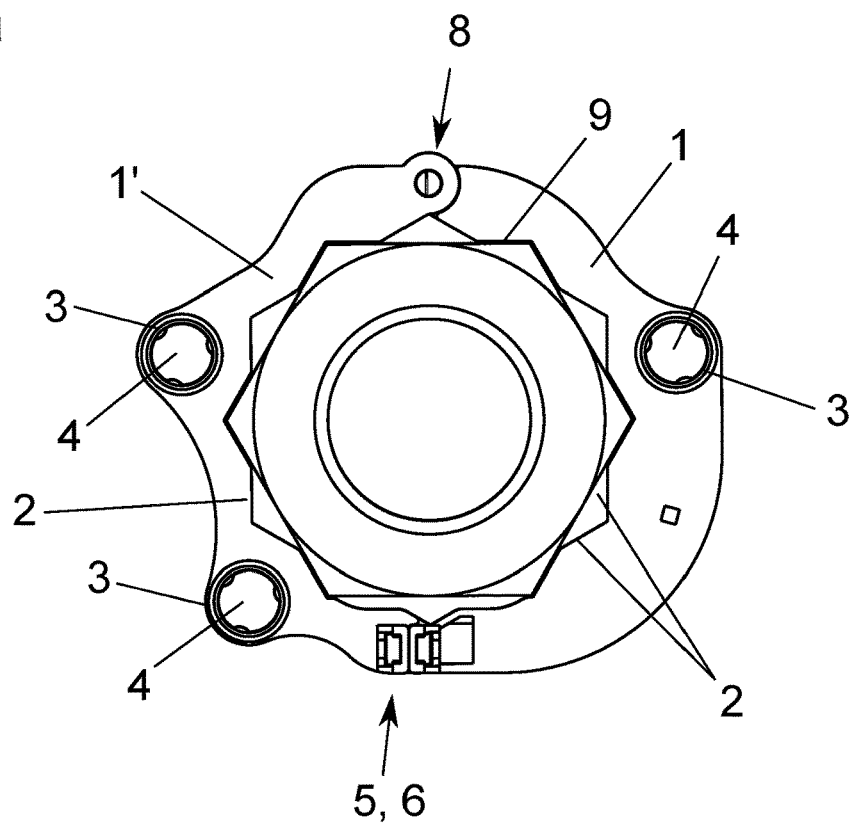
FIGS. 8a and 8b are top plan views of the monitoring attachment according to FIG. 7 in a closed and an opened state, respectively.
Figure 8B:
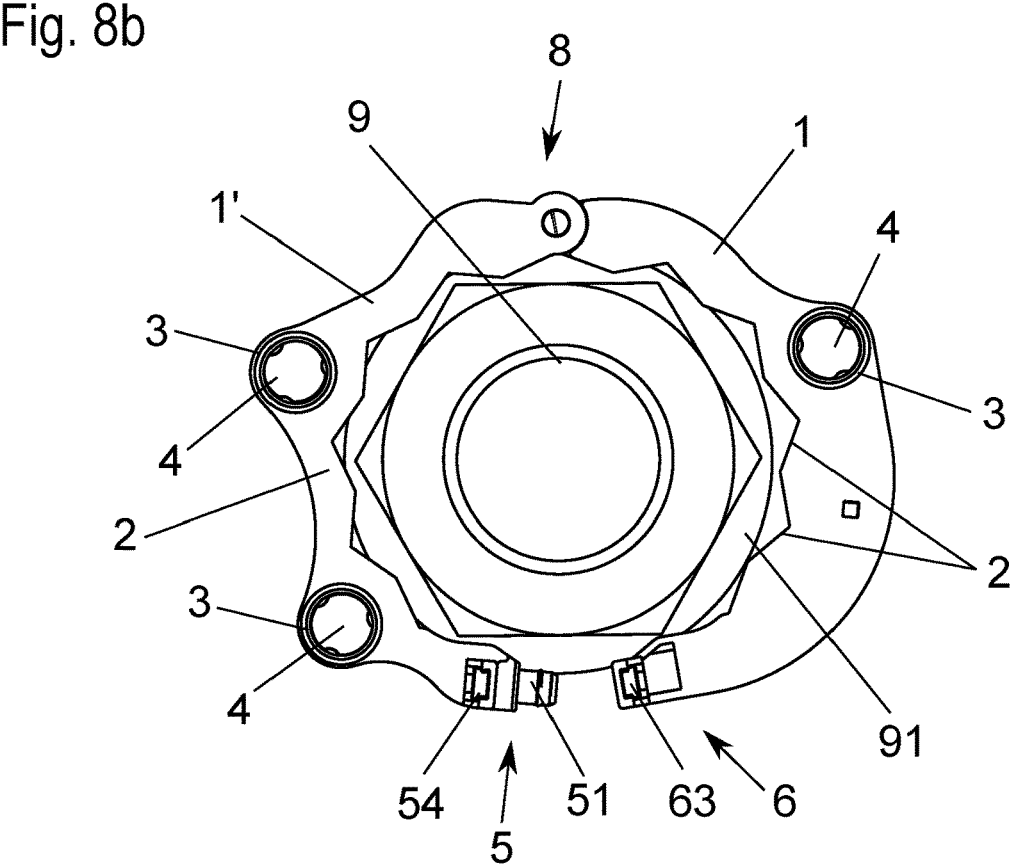

FIG. 7 shows the monitoring attachment in a closed state, placed onto a nut 9 in perspective. FIGS. 8a and 8b are plan views of the monitoring attachment with the nut 9 in a closed and an opened state, respectively. FIGS. 9a and 9c are perspective views of the monitoring attachment without a nut in the two different states. FIG. 9a shows the closed state of the monitoring attachment, and FIG. 9b additionally depicts a detail depiction of the connecting region. FIG. 9c depicts the two segments 1, 1' separated from one another. Finally, FIG. 10 is an isometric exploded depiction analogous to FIG. 4 of the first exemplary embodiment.

The basic structure of the monitoring attachment of the second embodiment corresponds to that of the first example as described above. The differences between the two embodiments will be explained below.

The main difference from the first embodiment is that a plug-in connection is provided only at one connection point of the segments 1, 1', whereas the other connection point is formed by a hinge 8. The function of the monitoring attachment remains the same—the formation of a crack or a breakage or other damage to the nut 9 pushes the two segments 1, 1', which tightly abut the periphery of the nut 9 at least at points, away from one another, as a result of which the plug-in connection opens and a conductor loop situated in the interior is interrupted. The hinge 8 restricts the movement of the segments 1, 1' relative to one another to a pivoting movement. As clearly shown in FIGS. 9c and 10, the hinge 8 is implemented in the present example in that pins 81 are configured in one segment, which engage in bearing bores 82 on the other segment 1, 1'. Of course, other configurations of the hinge 8 are conceivable. The hinge 8 can also be configured as a film hinge, such that both segments 1, 1' can be produced in one piece in an injection-moulding process, if required.

Since only one plug section 5 and receiving section 6 is provided, only one contact element 75 and one mating contact element 76 are employed in the conductor-and-contact arrangement 7. The conductor section 74 which, in the present example, leads to the mating contact element 76, is appropriately configured to be longer and is guided through the hinge 8 or past the hinge 8.

A further difference in the second embodiment relates to the locking mechanism at the plug-in connection between the two segments 1, 1'. In the present case, this is not performed via snap-lock elements, but rather via two magnets 54 and 63 which interact with one another. For this purpose, adjacent to the shaft 51 of the plug section 5 and the shaft receptacle 61 of the receiving section 6 respectively, there are provided tabs which, in the closed state of the plug-in connection, abut one another with opposing surfaces and into which the magnets 54 and 63 are inserted in the closed state, the two magnets 54 and 63 exert a closing force on the plug-in connection which on the one hand brings about secure contact between the contact element 75 and the mating contact element 76 and on the other hand can be reversibly opened and closed again.

It will be understood that this type of closure between the two segments 1, 1 via the magnets 54 and 63 can also be employed instead of the snap-lock connection in the first embodiment. Conversely, the snap-lock connection of the first embodiment can be employed in the present embodiment.

A wired connection of the monitoring attachment to an evaluation unit is depicted in both embodiments. In principle, it would also be conceivable to arrange on the circuit board 71 a radio transmitter which wirelessly transmits a signal to a receiving station via a closed or opened conductor loop of the conductor-and-contact arrangement 7.

The configuration with the power cable 73 offers the advantage of wiring, in a simple manner, a number of the shown monitoring attachments in series and to connect the series connection to only one evaluation unit. Through the type of the wiring, an interruption of contact in any of the monitoring attachments involved is detected using only one monitoring apparatus.

In particular, the series connection of the monitoring attachments presents itself in particular when a plurality of spatially adjacent nuts are being monitored, e.g. on the same flange. In this case, the aforementioned LED 72 arranged on the circuit board 71 can be connected in a simple manner in parallel to the respective conductor loop, i.e. parallel to the outgoing conductor sections 74 of the circuit board 71, if necessary with a series resistor. If an interruption of the conductor loop occurs in the monitoring attachment, the measuring current commutates to the LED 72 which lights up and thus signals the interruption of the associated conductor loop. The interruption nevertheless can be registered simply by the external evaluation unit by means of a change in resistance or the voltage drop (in the diode in the forward direction) arising in the LED 72. In the case of a number of monitoring attachments connected one behind the other in series, the LED 72, of that monitoring attachment which has triggered, lights up. In this manner, individual signalling can nevertheless take place inside a monitoring attachment without great expense on electronics and the damaged nut can be identified quickly.

If a translucent casting compound is used for casting the cavities of the segments 1, 1', the LED 72 can advantageously be arranged directly on the circuit board 71. In the surface of the segment 1, there is provided an opening in the region of the LED 72 through which the light emitted by the LED 72 is then visible from the outside, without special light-conducting elements having to be present or the LED 72 itself having to be positioned in the opening. In this manner, the sealing of conductor-and-contact arrangement 7 achieved by the casting resin is not impaired. In addition, manufacturing cost for the monitoring attachment is reduced.

Figure 11B:
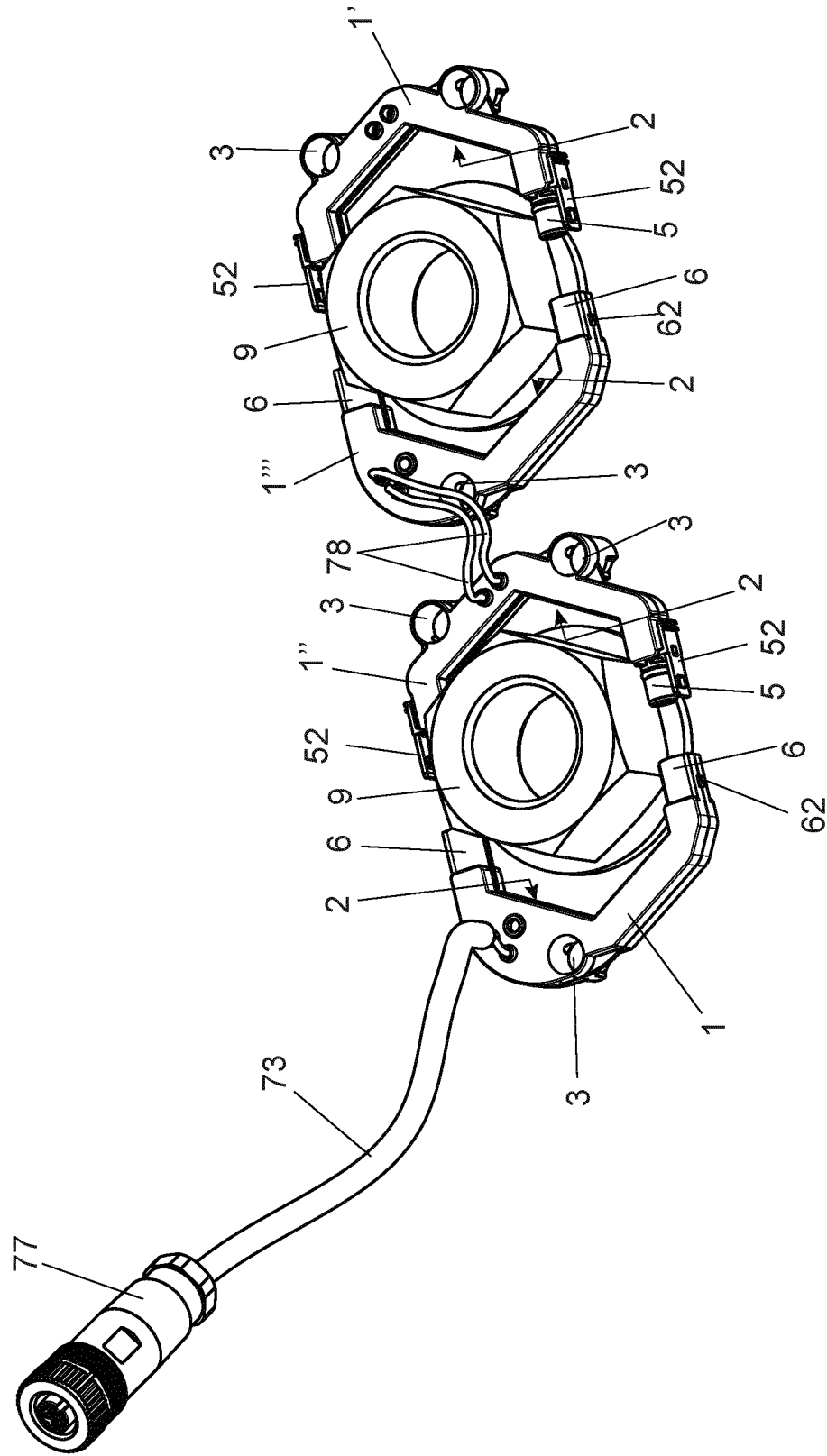
Figure 12:
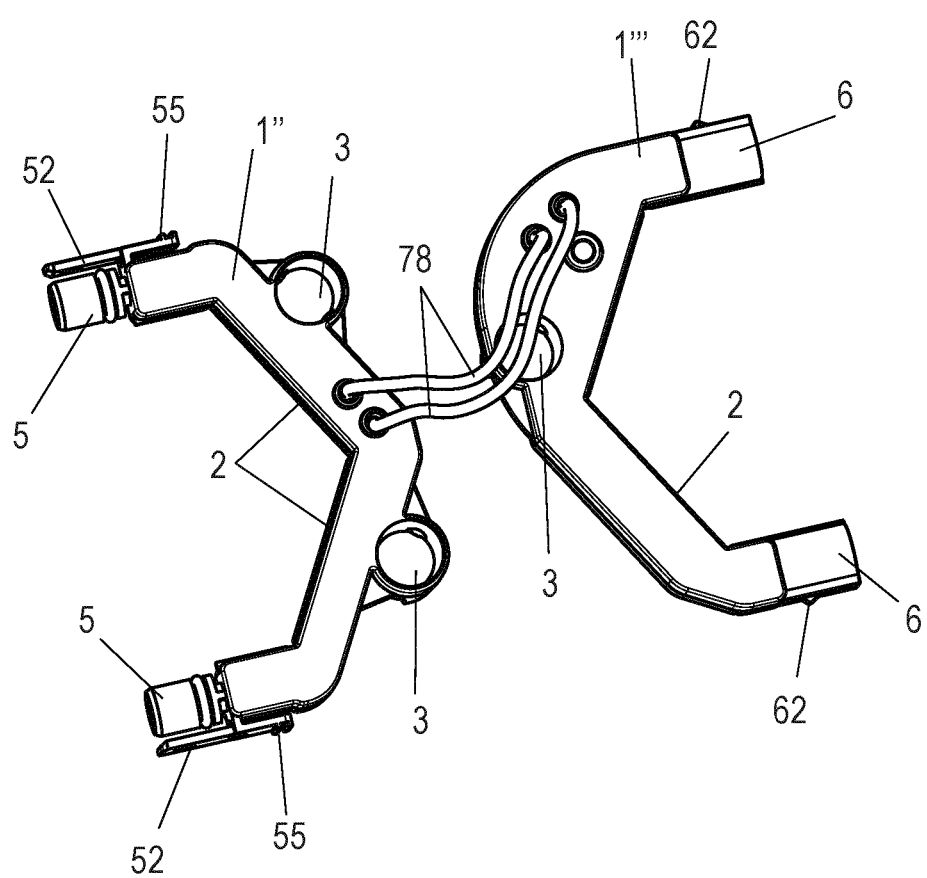
FIG. 12 is a perspective view of two segments of the monitoring attachments from FIGS. 11a and 11b which are coupled via a connecting cable.

FIGS. 11a and 11b show an embodiment with two serially connected monitoring attachments FIG. 11a depicts a closed and operable state and FIG. 11b depicts an opened state, for example during installation and removal respectively.

The embodiment is particularly designed for series connection of a number of monitoring attachments. By way of example, two monitoring attachments on two different nuts 9 are shown in FIGS. 11a and 11b The depicted arrangement can be expanded to any desired number of further monitoring attachments and number of nuts 9 being monitored, as will be explained further below.

A first monitoring attachment, which is depicted on the left side in FIGS. 11a and 11b, is composed of two substantially semicircular segments 1 and 1", and a second monitoring attachment is depicted on the right and is composed of two segments 1" and 1'. Magnet receptacles 3 are configured on the segments, into which in each case it is possible to insert a magnet 4 (not shown), with which the monitoring attachments can be fixed in the mounted state, e.g. on an underlying component such as a flange.

As in the first embodiment, the segments 1, 1" and 1" and 1' respectively, which in each case form a monitoring attachment, can be connected to one another or separated from one another at their two end sections and for this purpose have plug sections 5 and receiving sections 6 with electrical contacts.

In contrast to the first embodiment, in the present case both plug sections are configured on one of the segments, on segment 1" in this embodiment, and both receiving sections 6 are configured on the other segment, segment 1. A mirror-image configuration, in which each segment in each case has a plug section 5 and a receiving section 6, is also possible.

In each case one plug section 5 and one receiving section 6 are plugged into one another, wherein an electrical connection is established between conductor-and-contact arrangements which are not shown. As in the previously shown designs, plug sections 5 and receiving sections 6 snap-lock together, but in such a manner that they release from one another in the event of greater force, e.g. the breaking of a nut. For this purpose, a snap-lock element 52, which in the present case is arranged as a rocker over a web on segment 1" or 1', is configured on the plug section 5. A tongue, which points forwards in the plug-in direction, of the snap-lock element 52 snap-locks with a mating snap-lock element 62 of the receiving section 6 when plugged in. The mating snap-lock element 62 is, for example, configured in the form of a thickening on the receiving section 6. Through pressing on a releasing section 55 of the snap-lock element 52, which is situated in the rear in the plug-in direction, the front, snap-locking section of the snap-lock element 52 is raised and snap-locking with the mating snap-lock element 62 is released. This can be used to open the monitoring attachment, for example for maintenance purposes or for exchanging. Alternatively, instead of snap-locking, a magnetically fixed plug-in connection is also possible, as is shown in the second embodiment.

As in the previously shown monitoring attachments, the segment 1 also has a conductor-and-contact arrangement which can be connected to a monitoring device via a power cable 73 and a power plug 77.

Connections in the form of a connecting cable 78, formed by two separate conductors connecting the segment 1' to the first segment 1" of the second monitoring attachment, lead from the segment 1". A middle element is thus formed which includes the two segments 1" and 1 which are connected to one another. FIG. 12 shows this middle element once again in greater detail, separately from the monitored nuts 9.

The first segment 1''' of the second monitoring attachment is configured identically to the first segment 1 of the first monitoring attachment, up to the nature of the connection (connecting cable 78 instead of the power cable 73). Consequently it in turn has the two receiving sections 6 which can be connected to plug sections 5 of the further segment 1'.

The connecting cable 78 formed by the two separate conductors in the shown example can, in an alternative configuration, also be enveloped to protect against abrasion and/or breaking-away, e.g. by a shrink sleeve, by springs, by a cable jacket and/or by a spiral protector. In a further configuration, it is possible to provide a device to fix the connecting cable 78 to one or both monitoring attachments which it connects, and/or to tighten it between the monitoring attachments. This also serves to protect the connecting cable, e.g. from abrasion. This can be relevant in the case of moving monitoring attachments, e.g. in the case of monitoring attachments which are mounted on a rotating flange connection of wind energy plants. The apparatus for fixing and or tightening can be bores or eyelets, for example, which are configured in or on the segments 1"·1'''.

In the depicted example, the segment 1 is equipped with a closed conductor-and-contact arrangement, in which the two plug sections 5 are directly connected to one another. This segment 1' could also be plugged directly into the segment 1, as a result of which an individual monitoring attachment would be formed which can be connected via the power cable 73. From the basic structure, the segment 1' corresponds to the segment 1", with the difference that no connecting cable is provided and contacts in the two receiving sections 6 are directly connected in an electrically conductive manner via a conductor instead.

In the example shown, a chain of the two monitoring attachments is instead formed by the middle element which includes the segments 1" and 1''' coupled together. By using such middle elements, the chain of the monitoring attachments would be able to be appropriately lengthened. Via the depicted chain, a closed current circuit is formed by the upper half (in the figures) of the segment 1 over the upper half of the segment 1", the upper half of the segment 1''', the segment 1', the lower half of the segment 1''', the lower half of the segment 1" and the lower half of the segment 1, wherein this current circuit is opened when each of the four shown plug-in connections between the plug section 5 and the receiving section 6 is opened e.g. through breakage of one of the nuts 9.

The previously shown embodiments each have precisely two segments 1, 1' or 1' and 1", respectively, and 1''' and 1'. Alternatively, a design with more than two segments is also possible which, when put together, enclose the nut 9 at their periphery.

The invention claimed is:

1. A monitoring attachment for monitoring a nut of a screw connection, comprising a conductor loop including at least two segments which together enclose a periphery of the nut and are held together by friction at at least one radial connection point, said conductor loop being guided around a periphery of the nut and over contacts at said at least one connection point and which is interrupted in the event of at least one of deformation, cracking and breakage of the nut.

2. The monitoring attachment according to claim 1, wherein two semicircular segments join to form a ring enclosing the nut and two connection points.

3. The monitoring attachment according to claim 2, and further comprising a plug-in connection at said at least one connection point, said plug-in connection including a plug section on one of said segments and a receiving section on another of said segments.

4. The monitoring attachment according to claim 3, in which both connection points comprise plug-in connections.

5. The monitoring attachment according to claim 3, wherein one of said connection points is a plug-in connection and another connection point comprises a hinge.

6. The monitoring attachment according to claim 3, wherein said plug section includes a cylindrical shaft and said receiving section includes a receptacle configured to receive said shaft to define said plug-in connection.

7. The monitoring attachment according to claim 6, wherein said cylindrical shaft contains a groove and further comprising a sealing ring inserted into said groove.

8. The monitoring attachment according to claim 6, wherein said plug-in connection includes an electrical contact arranged in one segment and an electrical mating contact arranged in another segment which define contacts of said at least one connection point.

9. The monitoring attachment according to claim 8, wherein said electrical contact has a deflecting contact tip with which it contacts a contact surface of said mating contact.

10. The monitoring attachment according to one of claim 1, and further comprising a snap-lock connection to retain said at least one connection point in a closed state.

11. The monitoring attachment according to one of claim 1 and further comprising at least one magnet to retain said at least one connection point in a closed state.

12. The monitoring attachment according to claim 11, wherein said at least one magnet comprises a contact of said conductor loop.

13. The monitoring attachment according to claim 1, and further comprising a circuit board from which conductors terminate in said contacts of said at least one connection point, said conductor sections and said contacts forming said conductor loop.

14. The monitoring attachment according to claim 13, wherein said circuit board includes one of a power cable and a power plug connected to said conductor loop.

15. The monitoring attachment according to claim 14, wherein said circuit board further includes an illumination device connected in parallel to said conductor loop.

16. The monitoring attachment according to claim 13, wherein said segments include a housing which is open to one side and a casting compound is arranged in said housing.

17. The monitoring attachment according to claim 16, wherein said circuit board and said conductor sections are embedded in said casting compound.

18. The monitoring attachment according to one of claim 1, and further comprising a connecting cable for connection with a further monitoring attachment.

* * * * *